United States Patent [19]

Haganuma

[11] Patent Number: 4,809,019

[45] Date of Patent: Feb. 28, 1989

[54] CHARACTER GENERATOR FOR THERMAL PRINTERS

[75] Inventor: Tomoyuki Haganuma, Yokohama, Japan

[73] Assignee: Ricoh Company, Ltd., Japan

[21] Appl. No.: 65,106

[22] Filed: Jun. 22, 1987

Related U.S. Application Data

[63] Continuation of Ser. No. 323,028, Nov. 19, 1981, abandoned.

[30] Foreign Application Priority Data

Nov. 20, 1980 [JP] Japan ............................ 55-163609

[51] Int. Cl.[4] ........................................ G01D 15/10

[52] U.S. Cl. .............................. 346/76 PH; 219/216; 400/120

[58] Field of Search .................. 346/76 PH; 219/216; 400/120

[56] References Cited

U.S. PATENT DOCUMENTS 3,496,333 2/1970 Alexander et al. ........ 346/76 PH X 4,134,696 1/1979 Hanakata et al. ............. 346/76 PH 4,219,824 8/1980 Asai ................................ 346/76 PH

FOREIGN PATENT DOCUMENTS 0018762 11/1980 European Pat. Off. ....... 346/76 PH

*Primary Examiner*—A. D. Pellinen

*Assistant Examiner*— DeBoer

*Attorney, Agent, or Firm*—Guy W. Shoup; Paul J. Winters

[57] ABSTRACT

A character generator for use in a printing system such as a thermal printing system, which is capable of printing characters with uniform contrast is provided. The character generator comprises a first section for containing therein a desired character pattern information and a second section for containing therein a driving power control information associated with the character pattern in the first section. Preferably, the driving power control information has individual control signals associated with the rows or columns of the character pattern. Thus, driving power may be applied selectively at least at two different levels when printing a character, preferably row by row or column by column.

15 Claims, 4 Drawing Sheets

(a) (b) (c)

CHARACTER GENERATOR FOR THERMAL PRINTERS

This is a continuation application from application Ser. No. 323,028 filed Nov. 18, 1981 , now abandoned.

BACKGROUND OF THE INVENTION

1. Field of the Invention

This invention relates to a character generator advantageously usable in printers such as serial-type thermal printers provided with a relatively inexpensive single array head. More in particular, the present invention relates to a character generator for thermal printers, which enables character imprints of excellent quality and uniform contrast to be produced by applying driving signals to the thermal printing head in accordance with the power application information previously stored in the character generator for each character pattern.

2. Description of the Prior Art

For relatively low-cost thermal printers, use is commonly made of a single array type thermal head which includes, for example, seven heat-producing elements arranged in a single array. Driving current signals are supplied to the heat-producing elements column by column from the data corresponding to a character pattern to be printed and the heat-producing elements are thereby selectively activated to produce heat for forming an imprint.

If the heat produced by each of the heat-producing elements fluctuates by deviating from a predetermined value, the printed characters will have uneven contrast and their quality will be deteriorated. Moreover, if an excessive heat is produced, the heat-producing elements may fail since they are usually made of an electrically resistive material and heat is produced by passing an electrical current through such an electrically resistive element. Thus, an excessive heat may cause deformation to such a resistive element to change its heat-producing characteristics, or the resistive element may be fused to cause disconnection in an extreme case. It should further be noted that the printing temperature of the heat-producing elements when activated is affected by changes in ambient temperature, fluctuations of a power supply, characteristic changes of the thermal head, the temperature increase of the thermal head as a whole due to a continuous, long-hour operation, etc.

In order to cope with the above-described problem, several proposals have been made to maintain the printing temperature of the heat-producing elements within a predetermined range, thereby allowing printed characters of uniform contrast to be obtained at all times.

First, it has been proposed to provide temperature detecting elements mounted on a thermal head to thereby control a driving power supplied to the heat-producing elements by the actual temperature of the heat-producing elements. It is true that such feed-back control systems will provide an accurate control of the temperature of the heat to be produced for printing operation; however, such systems tend to be expensive and require additional elements and complicated wiring. Thus, this approach also suffers from disadvantages and hinders the application to relatively inexpensive thermal printers.

A thermal head having a matrix of heat-producing elements arranged in, for example, 5 columns by 7 rows is known in the art. With such a thermal head having a matrix of heat-producing elements, it has been proposed to control the printing temperature by counting the number of dots to be activated in each column of a character pattern to be printed such that a large electric power is supplied to the columns having many dots to be activated and a smaller power is supplied to the columns having less dots to be activated. This approach allows the printing temperature of each of the heat-producing elements to be maintained in a desired range and a printed character without contrast variations may be obtained. It should, however, be noted that it requires the provision of a separate control circuit complicated in structure for counting the number of dots to be activated column by column in each character pattern. Thus, this approach also tends to be expensive and suffers from various disadvantages.

A further prior art printing temperature control system has been proposed in connection with single array type thermal printers. In accordance with this prior art technique, a driving power is supplied to the thermal head according to the arrangement of dots to be activated in each column of a character pattern to be printed. That is, a high driving power is supplied to those dots which are located at the head of a continuous chains of dots to be activated or which are located by themselves as isolated dots in a character pattern to be printed; on the other hand, a low driving power is supplied to the remaining dots in the continuous chains.

This third approach allows the printing temperature to be maintained within a preferred range. However, similarly with the above-described two cases, this technique is not free of disadvantages. For example, since the arrangement of the dots to be activated must be detected column by column in a character pattern to be printed in determining the condition to apply a driving signal for each of the dots in a column, it is required that a separate control circuit complicated in structure be provided, which then makes the whole apparatus bulky and expensive.

SUMMARY OF THE INVENTION

The disadvantages of the prior art are overcome with the present invention and there is provided a character generator particularly suited for use in thermal printers.

The advantages of the present invention are preferably attained by providing a character generator for use in a printing system, said character generator comprising a first section for containing therein a character pattern information in the form of a matrix including m rows and n columns, where m and n represent integer numbers, and a second section for containing therein a driving power control information which includes individual driving power data for the corresponding rows or columns of the character pattern contained in said first section.

In a preferred embodiment, the character pattern information and the driving power control information are both expressed by binary data. The character generator of the present invention is preferably constructed in the form of a semiconductor memory such as a read-only memory, also referred to as ROM hereinafter. When formed as a ROM with use of the binary data, the binary data "1" may be used to apply a higher driving power to the associated column; whereas, the only binary data "0" may be used to apply a lower driving power, or vice versa. It is to be noted that the driving power data may be comprised of a single bit or a plurality of bits.

It is therefore an object of the present invention to provide a character generator which allows a printed character of excellent quality with uniform contrast to be obtained.

Another object of the present invention is to provide a character generator for use in a thermal printer, which is capable of maintaining the printing temperature in a predetermined range thereby providing constant contrast in printed characters.

A further object of the present invention is to provide a character generator which does not require the provision of any additional hardware elements in its application, for example, to printers.

A still further object of the present invention is to provide a character generator simple in structure and therefore inexpensive to manufacture.

Other objects, advantages and novel features of the present invention will become apparent from the following detailed description of the invention when considered in conjunction with the accompanying drawings.

BRIEF DESCRIPTION OF THE DRAWINGS

FIG. 1(*b*) is a schematic illustration showing another form of the present character generator in which letter "B" is contained in the character pattern information section;

FIG. 1(*c*) is a schematic illustration showing a further form of the present character generator in which letter "C" is contained in the character pattern information section;

DESCRIPTION OF THE PREFERRED EMBODIMENTS

Figure 1:
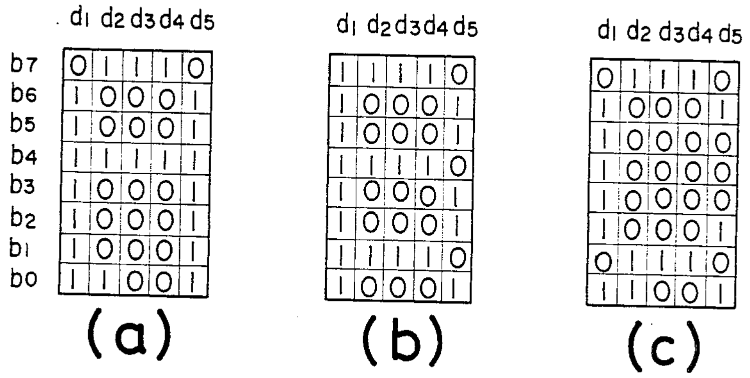
FIG. 1(*a*) is a schematic illustration showing one embodiment of the present invention in which letter "A" is contained in the character pattern information section defined by rows $b_1$ through $b_7$ and columns $d_1$ through $d_5$, and the driving power information is contained in row $b_0$.

Referring now to FIGS. 1(*a*) through (*c*), there are shown three different forms of one embodiment of the present invention. In each of FIGS. 1(*a*) through (*c*), the character generator comprises a character pattern information section defined by a matrix including seven rows $b_1$ through $b_7$ and five columns $d_1$ through $d_5$, and a driving power control information section defined at row $b_0$. As shown, all of the information is constructed by binary data, i.e., number "0" or "1". FIG. 1(*a*) shows that letter "A" is contained in the character pattern information section. Similarly, FIGS. 1(*b*) and (*c*) show that letters "B" and "C" as contained in the respective sections.

In the character pattern information section, the binary data "1" indicates that a driving current is passed through the corresponding heat-producing element thereby forming a dot; on the other hand, the other binary data "0" indicates that no current is supplied to the corresponding heat-producing element thereby no dot is formed. In the driving power control information section, the binary data "1" indicates that a larger power is applied when the associated column is printed; whereas, the other binary data "0" indicates that a smaller power is applied when the associated column is printed.

It is to be noted that the character generators shown in FIGS. 1(*a*) through (*c*) are to be employed in a single array type thermal head which has seven heat-producing elements in correspondence to the seven rows $b_1$ through $b_7$, and the bit information $b_1$ through $b_7$ of each column are supplied to the thermal head at a time sequentially from column $d_1$ to column $d_5$. The driving power control information is previously determined for each character in view of its pattern and stored in the driving power control information section, or row $b_0$. For example, one criterion for allocating the high power signal "1" for a column of bits in a character pattern may be that there is at least one bit in the column which has not been heated in the previous column. The other columns are allocated with the low power signal "0". In the case of the character generator shown in FIG. 1(a), the bit data in column $d_1$ and row $b_0$ has the high power signal "1" because this is the first column of bits and it has six "1's."In column $d_2$, the bit data in row $b_0$ also has the high power signal "1" because the bit in row $b_7$ in this column is the binary data "1" and the previous data in row $b_7$ is "0." In the next two columns, i.e., $d_3$ and $d_4$, the bits in row $b_0$ are both "0", because no change from "0" to "1" takes place when moving from column $d_1$ to column $d_2$, and further to column $d_3$. Finally, in column $d_5$, the bit in row $b_0$ is the high power signal "1" because "0" to "1" change takes place in rows $b_1$, $b_2$, $b_3$, $b_5$ and $b_6$.

The driving power control information for the character generators shown in FIGS. 1(*b*) and (*c*) have been determined on the basis of the above-described criterion and the results are shown in the respective rows $b_0$. It is to be noted that although only alphabetical letters are used in the illustrated examples, driving power control information may be determined for any character patterns such as numerals, symbols and chinese characters.

In character generators, a matrix of seven rows by five columns or of nine rows by seven columns is commonly used to represent a character. Thus, they differ from commercially available memory devices which are predominantly structured for eight bits. Accordingly, when commercially available memory devices are used to form character generators having character patterns comprised of a matrix of seven rows and five columns as shown in FIGS. 1 (*a*) through (*c*), one row or one bit in each column becomes redundant.

However, in accordance with the present invention, such redundancy may be turned into an advantage because the extra row, e.g. row $b_0$, can be used to store driving power control information. This is particularly advantageous since no addition of hardware is required in manufacturing the present character generators. Thus, the present invention has made it feasible to apply the idea of controlling the printing temperature easily to relatively inexpensive thermal printers which use a single array type thermal head. It is to be noted that driving power control information may be provided for each row of a character pattern as well as for each column as described above. The present character generators may be structured in the form of well-known semiconductor memory devices such as read-only memories (ROM's) and random access memories (RAM's).

Figure 2:
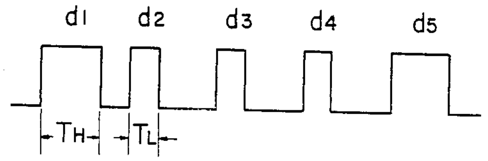
FIG. 2 is a timing diagram showing a driving power control signal having two kinds of pulses different in pulse width which is constructed in one form from the information taken from row $b_0$ of the character generator shown in FIG. 1(*b*)

FIG. 2 shows a driving power control signal as taken from row $b_0$ of the character generator shown in FIG. 1(*b*). The signal includes two kinds of pulses; those having a long pulse width $T_H$ and those having a short pulse width $T_L$. As understood, the long pulse width $T_H$ corresponds to the high power bit "1"; whereas, the short pulse width $T_L$ corresponds to the low power bit "0." As shown, both of the pulses $T_H$ and $T_L$ have the same height. Thus, the control of application of power to the printing head is carried out by changing the duration of application of power.

It is to be noted that the control signal taken from the driving power control information section of the present character generator should not be limited to the one shown in FIG. 2. Alternatively, the control signal may be formed by pulses of the same pulse width but having different heights, indicating different driving current levels, or the control signal may include pulses which have variable pulse widths as well as variable heights.

In the above embodiments, the binary data, i.e., "0" or "1", is used so that the driving power control signal has two states, high or low. It should, however, be noted that two or more bits as a code may be used to define one level of the control signal, in which case a multi-level control in the application of driving power can be carried out.

It should further be noted that the present invention may also be easily applied to thermal printers which have a matrix-formed, e.g., seven rows by five columns, thermal head instead of the single array thermal head as described above. In this instance, however, the contents of the driving power control information have to be determined on a criterion which is different from the previous single array case. For example, one criterion in order to obtain printed characters of uniform contrast may be such that a relatively smaller power is supplied for those character patterns having a relatively smaller number of dots or picture elements, and a relatively larger power is supplied for those character patterns having a relatively large number of dots or picture elements.

Figure 3:
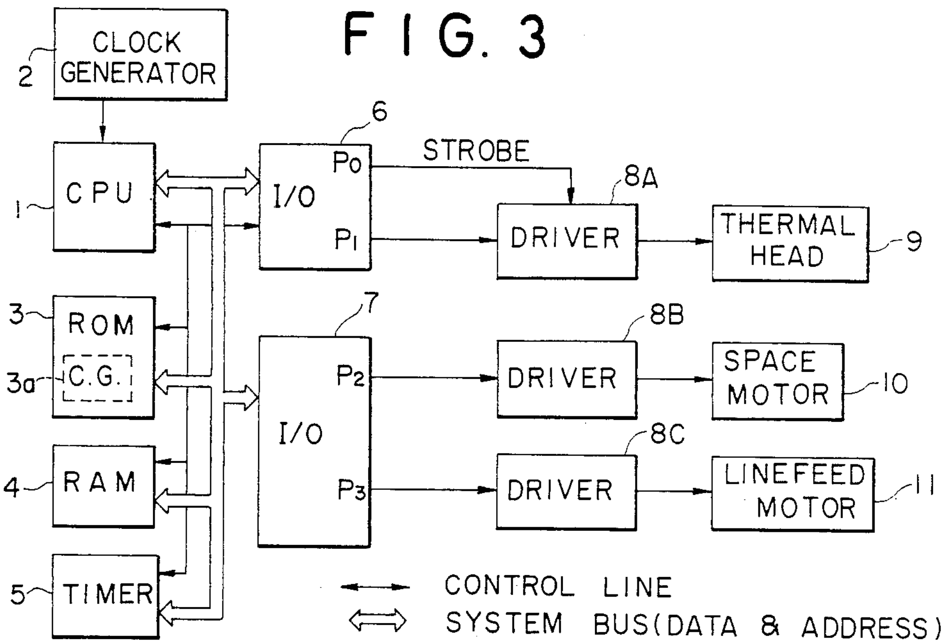
FIG. 3 is a block diagram of a thermal printing system to which the present invention may be applied.

FIG. 3 is a block diagram showing a thermal printer system in which the present character generator is incorporated. Since such a thermal printer system is well know in the art, detailed explanation of the system will not be repeated here. Briefly stated, the system includes a central processing unit (CPU) 1 which is connected to a clock generator 2 to receive clock pulses as a source for synchronizing the operation of different components. CPU 1 is connected to read-only memory 3 which includes the present character generator 3*a* through a control line and a system bus which includes a data bus and an address bus.

Figure 4:
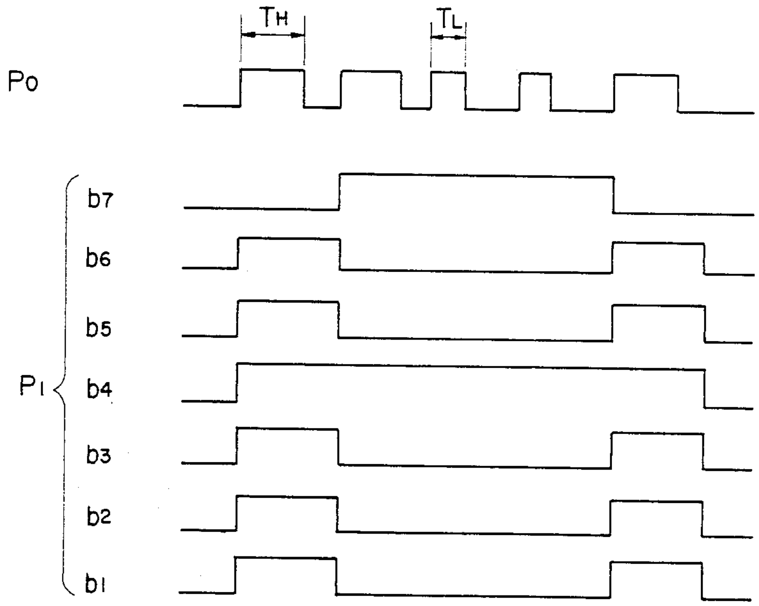
FIG. 4 is a timing diagram which is particularly useful in understanding the operation of the system shown in FIG. 3.

The system of FIG. 3 further includes a random access memory 4, timer 5, a first I/O device having ports $P_0$ and $P_1$, a second I/O device having ports $P_2$ and $P_3$, all of which are interconnected to each other and with the above-mentioned CPU 1 and ROM 3 through the control line and the system bus. The port $P_0$ is connected to one input of a driver circuit 8A to supply a strobe signal comprised of the driving power control signal as shown in FIG. 4. The port $P_1$ is connected to another input of the driver circuit 8A, the output of which is connected to a thermal head 9. The port $P_1$ supplies character pattern information, and, therefore, if the thermal head 9 is of the single array type having seven heat-producing elements, the connection between the port $P_1$ to the thermal head 9 through the driver circuit 8A includes seven interconnecting lines thereby allowing the supply of information of seven bits at a time as shown in FIG. 4. FIG. 4 shows the case when letter "A" is to be printed by sending character pattern information column by column through port $P_1$ together with the driving power control information through port $P_0$.

Returning to FIG. 3, the thermal printer system further includes a space motor 10 which is connected from port $P_2$ of the second I/O device through a driver circuit 8B and a linefeed motor 11 which is connected from port $P_3$ of the I/O device through another driver circuit 8C.

Figure 5:
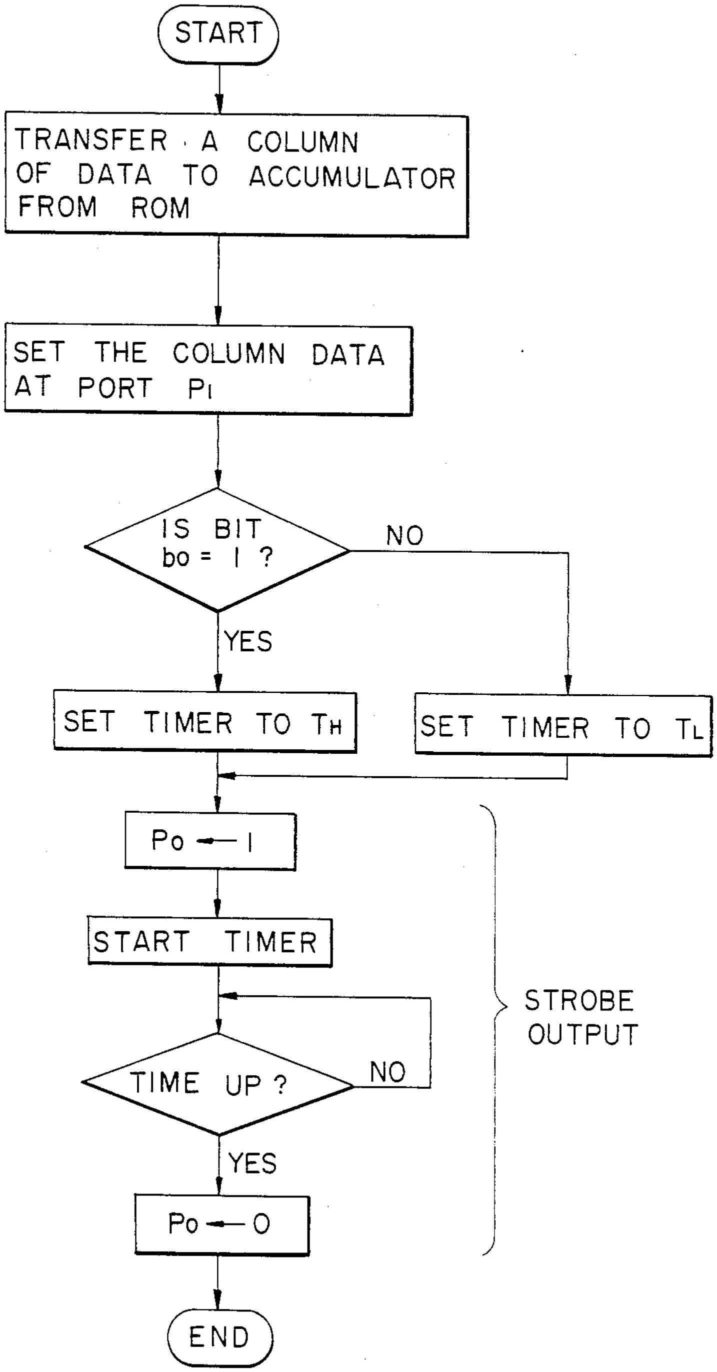
FIG. 5 is a flow chart which is also useful in understanding the operation of the system shown in FIG. 3.

The operation of the system shown in FIG. 3 is self-explanatory for those skilled in the art, especially when reference is made to the flow chart shown in FIG. 5 and therefore its detailed description will be omitted here.

Figure 7:
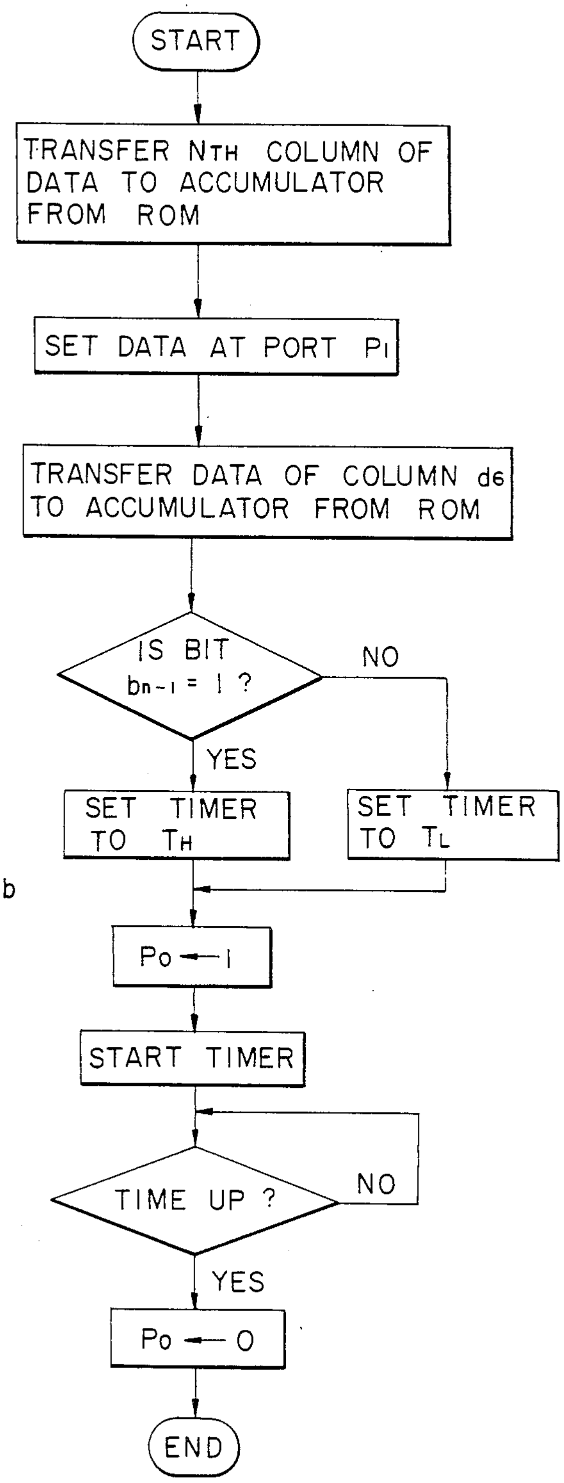
FIG. 7 is a flow chart showing the sequence of operation of the system of FIG. 3 when the character generator of FIG. 6 is used.
Figure 6:
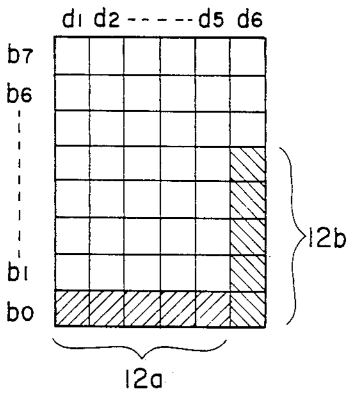
FIG. 6 is a schematic illustration showing another embodiment of the present invention in which the driving power information section includes a first driving power control information for the rightward movement of the thermal head and a second driving power control information for the leftward movement of the thermal head.

FIG. 6 schematically shows the character generator in accordance with another embodiment of the present invention. As shown, the character generator of FIG. 6 has a character pattern information section defined by rows $b_1$ through $b_7$ and columns $d_1$ through $d_5$ and a driving power control information section defined by row $b_0$ and column $d_6$. Thus, this embodiment is different from the above-described examples by the provision of extra column $d_6$. Those bits 12a of row $b_0$ in columns $d_1$ through $d_5$ constitute a first group of driving power control information which is to be used when printing is carried out during a period in which the thermal head is moving to the right with respect to the printing paper. On the other hand, those bits 12b of column $d_6$ in rows $b_0$ through $b_4$ constitute a second group of driving power control information which is to be used when printing is carried out during a period in which the thermal head is moving to the left with respect to the printing paper. Accordingly, the character generator of FIG. 6 is to be used in the bi-directional printing system. FIG. 7 is the flow chart showing the sequence of operation of the system shown in FIG. 3 when the character generator of FIG. 6 is applied.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A character generator in a printer for forming characters by an arrangement of dots formed in a matrix of rows and columns, said printer having a predetermined number of thermal printing elements arranged along side one another for selectively forming dots in a row on a heat-sensitive paper, power means for moving said printing elements across said paper into respective column positions of said matrix, and activating means for selectively activating said printing elements by supplying a level of power thereto as they are placed into said respective column positions for forming a character, said character generator including first means for storing information indicating which of said printing elements are to be activated in each column position thereof; and second means for storing information available directly with the information of said first means for indicating a level of power to be applied to said printing elements by said activating means, said first and second means consisting essentially of a unitary semiconductor memory device storing said information in binary form, wherein the information of said first means indicates whether or not each one of said printing elements should be activated and the information of said second means indicates whether said activating means should supply power at a first level or a lower level.

2. A character generator according to claim 1, wherein the information of said second means indicates the activating means should supply power at said first level whenever a printing element is to be activated for printing in a particular column which has not been activated for printing in a column immediately preceding.

3. A character generator in a printer for forming characters by an arrangement of dots formed in a matrix of rows and columns, said printer having a predetermined number of thermal printing elements arranged along side one another for selectively forming dots in a row on a heat-sensitive paper, moving means for moving said printing elements across said paper into respective column positions of said matrix, and activating means for selectively activating said printing elements by supplying a level of power thereto as they are placed into said respective column positions of said matrix,, said character generator including first means for storing information indicating which of said printing elements are to be activated in each column position thereof; and second means for storing information available directly with the information of said first means for indicating a level of power to be applied to said printing elements by said activating means, the information of said second means indicating said activating means should be supplied with a first level of power whenever a printing element is to be activated for printing in a particular column which has not been activated for printing in a column immediately preceding and indicating said activating means should be supplied with a lower level of power when each printing element to be activated for printing in a particular column has been activated for printing in a column immediately preceding.

4. A character generator according to claim 3, said information of said second means includes information indicating the level of power to be supplied when said printing elements are being moved in a first direction along said paper and information indicating the level of power to be supplied when said printing elements are being moved in the opposite direction along said paper.

5. A printer adapted to form characters by an arrangement of dots formed in a matrix of rows and columns, said printer including a predetermined number of thermal printing elements arranged along side one another for selectively forming dots in a row on a heat-sensitive paper; activating means for moving said printing elements across said paper into respective column positions of said matrix; activating means for selective activating said printing elements by supplying a level of power thereto as they are placed into said respective column positions for forming a character; and a character generator including first means for storing information indicating which of said printing elements are to be activated in each column position thereof; and second means for storing information available directly with the information of said first means for indicating a level of power to be applied to said printing elements by said activating means, said first and second means consisting essentially of a unitary semiconductor memory device storing said information in binary form, wherein the information of said first means indicates whether or not each one of said printing elements should be activated and the information of said second means indicates whether said activating means should supply power at a first level or a lower level.

6. A printer according to claim 5, wherein the information of said second means indicates the activating means should supply power at said first level whenever a printing element is to be activated for printing in a particular column which has not been activated for printing in a column immediately preceding.

7. A printer adapted to form characters by an arrangement of dots formed in a matrix of rows and columns; said printer including a predetermined number of thermal printing elements arranged along side one another for selectively forming dots in a row on a heat-sensitive paper; moving means for moving said printing elements across said paper into respective column positions of said matrix; activating means for selective activating said printing elements by supplying a level of power thereto as they are placed into said respective column positions for forming a character; and a character generator including first means for storing information indicating which of said printing elements are to be activated in each column position thereof; and second means for storing information available directly with the information of said first means for indicating a level of power to be applied to said printing elements by said activating means, the information of said second means indicating said activating means should be supplied with a first level of power whenever a printing element is to be activated for printing in a particular column which has not been activated for printing in a column immediately preceding and indicating said activating means should be supplied with a lower level of power when each printing element to be activated for printing in a particular column has been activated for printing in a column immediately preceding.

8. A printer according to claim 7, said information of said second means includes information indicating the level of power to be supplied when said printing elements are being moved in a first direction along said paper and information indicating the level of power to be supplied when said printing elements are being moved in the opposite direction along said paper.

9. A character generator in a serial printing system of the type in which a thermal head provided with a predetermined number of heat-producing elements arranged in a line is moved in the direction normal to said line to serially print a desired character column by column in the form of a dot matrix, comprising:

(a) first storing means for storing at least a character pattern in the form of a dot matrix including m rows and n columns, where m and n represent integer numbers, all of m dot data in each column being supplied to the corresponding heat-producing elements of said thermal head at the same time when recording; and (b) second storing means for storing a column driving power control data for each of the columns of the character pattern stored in said first storing means, said column driving power control data being previously and uniquely pattern is read out of said first storing means, the corresponding column driving power control data can be directly read out of the second storing means.

10. The character generator of claim 9 wherein said second storing means includes a first group of column driving power control data which is to be used when the printing is to be carried out in one direction and a second group of column driving power control data which is to be used when the printing is to be carried out in the direction different from said one direction.

11. The character generator of claim 9 wherein the character pattern and the column driving power control data are both expressed by the binary data.

12. The character generator of claim 11 wherein one of the binary data of said column driving power control data indicates to supply a higher power and the other of the binary data of said column driving power control data indicates to supply a lower power.

13. The character generator of claim 11 or 12 wherein said character generator is structured in the form of an integrate semiconductor memory.

14. The character generator of claim 13 wherein said semiconductor memory includes a read-only memory.

15. The character generator of claim 12 wherein the column driving power control data are previously determined on the basis of the fact that the character pattern is to be printed column by column sequentially from one end to the other.

* * * * *

UNITED STATES PATENT AND TRADEMARK OFFICE
CERTIFICATE OF CORRECTION

PATENT NO. : 4,809,019

DATED : February 28, 1989

INVENTOR(S) : Tomoyuki Haganuma

It is certified that error appears in the above-identified patent and that said Letters Patent is hereby corrected as shown below:

IN THE CLAIMS

Claim 1, Col. 6, line 68, "power" should be --moving--.

Claim 5, Col. 8, line 3, "activating" should be --moving--.

Signed and Sealed this

Tenth Day of October, 1989

*Attest:*

DONALD J. QUIGG

*Attesting Officer*

*Commissioner of Patents and Trademarks*